Oct. 18, 1949.   I. SLOANE   2,485,325
COLLAPSIBLE TRIPOD DOLLY
Filed May 7, 1946
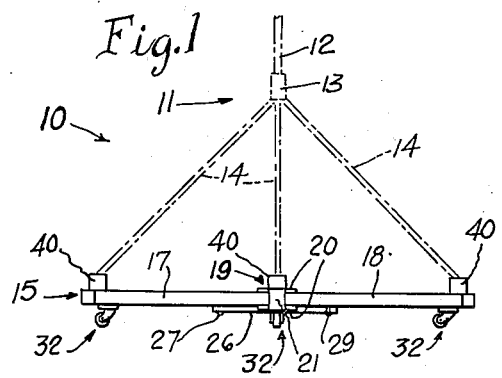
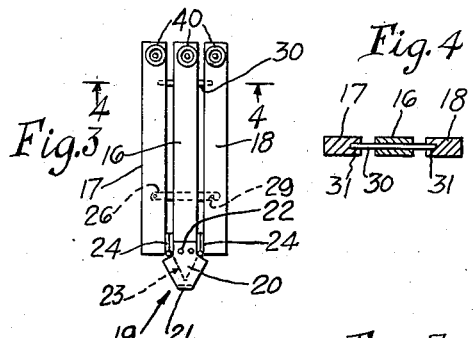
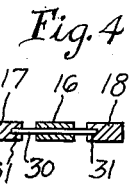
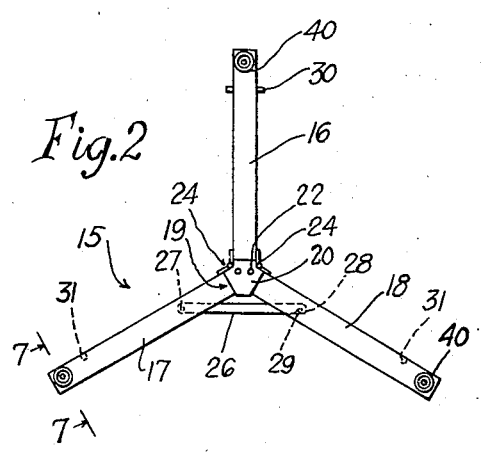
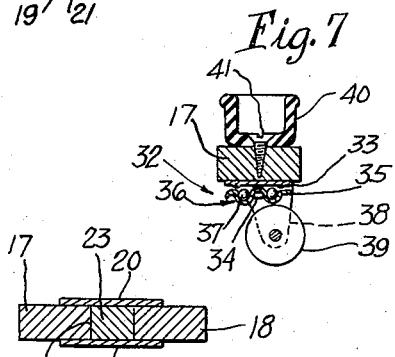
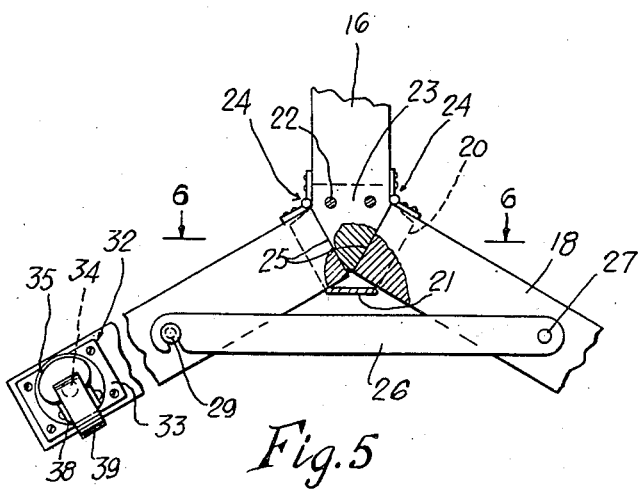
INVENTOR.
Irving Sloane
BY
Louis Shumacher
Atty.

Patented Oct. 18, 1949

2,485,325

UNITED STATES PATENT OFFICE 2,485,325

COLLAPSIBLE TRIPOD DOLLY

Irving Sloane, Brooklyn, N. Y.

Application May 7, 1946, Serial No. 667,862

8 Claims. (Cl. 280—36)

This invention relates to a dolly for a photographic flood light carrying tripod.

One object of the invention is to provide improved detachable collapsible means for supporting a tripod carrying a floodlight for quick and easy movement of the tripod to a desired position for projecting light upon the object that is being photographed.

In photography, tripod stands are used for many purposes, and whereas a high degree of rigidity is required for the camera, it is desirable that the flood lights be adapted to be quickly and easily moved to different positions so that the photographer may conveniently obtain the requisite lighting effects. However, the tripod that is presently used for carrying the floodlight is formed with legs which cause a high degree of friction with the ground or floor so that it is necessary to lift the tripod to shift it from point to point. It is therefore difficult and inconvenient to obtain the most desirable position of the flood light, and this difficulty is multiplied if a number of floodlights are used, according to the customary manner. Accordingly the invention aims to provide improved means whereby the floodlight carrying tripod can be moved along the floor by a simple sliding or rolling action to obtain the desired direction and concentration of the light.

I have found that if it be attempted to secure casters or the like to the legs of this tripod, a difficulty occurs in that the rollers tend to bind at certain angles of the legs so that such a construction would be impractical. Furthermore there are a great many of the conventional floodlight carrying tripods in use, and the present invention furnishes a device which is easily applicable thereto.

It is therefore an object of the invention to furnish a device of the character described, having the advantages mentioned and avoiding the difficulties referred to.

Another object of the invention is the provision of a collapsible, expansible frame or support for a floodlight tripod having improved means combining one or more of the following novel structural features: an improved hinge and socket structure for holding the radial arms of the frame in a horizontal plane without sagging or breakage of the central pivotal region where the strain on the frame is the greatest; an improved antifriction means on the arms for supporting the frame, arranged so as to occupy as little space as possible in the collapsed position of the frame; an improved means for releasably engaging the legs of the tripod with the arms referred to whereby legs of different size and shape may be readily held in position; an improved means for so connecting the tripod legs with the frame, that accidental expansion of the tipod leg structure is avoided; a single means adapted to lock the dolly frame in expanded and in collapsed position; and associated means to maintain the arms of the frame in a common plane when the dolly is collapsed.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in side elevation showing in expanded operative position, a floodlight carrying tripod dolly embodying the invention, with a portion of the tripod shown in dot-dash lines as mounted on the dolly.

Fig. 2 is a top plan view of the dolly.

Fig. 3 is a top plan view of the dolly in collapsed position, locked against expansion.

Fig. 4 is an enlarged sectional view on line 4—4 of Fig. 3.

Fig. 5 is an enlarged fragmentary bottom plan view with parts in section showing certain details of the dolly constructions.

Fig. 6 is a sectional view on line 6—6 of Fig. 5.

Fig. 7 is an enlarged sectional view on the line 7—7 of Fig. 2.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes a device embodying the invention. The same may include any suitable tripod adapted to carry a floodlight and having a main central shaft 12 comprising a portion 13 to which are pivotally connected a plurality of legs 14 in equally angularly spaced relation to each other. A portion 13 may be slidable along the standard 12 and the legs 14 may be swingable upward to lie closely around the standard, but such structure forms no part of the instant invention.

A dolly 15 embodying the invention comprises a plurality of arms 16, 17, and 18 suitably pivotally associated with each other at the central region of the dolly for expansion and collapsing thereof, but preferably lying in a common plane in both the expanded and collapsed positions for reasons hereinafter apparent. At the inner ends of the arm 16 there is mounted thereon a bearing member 19 which may be of U-shaped form to provide a pair of spaced parallel wings 20 interconnected by a bight portion 21. Between these wings 20 is received the adajcent portion of the arm 16 secured thereto as by rivets or screws 22; this part of the arm 16 is formed with a symmetrical convergent or tapered end 23 for a purpose hereinafter described. The wings 20 are substantially wider than the portion 23 and of a shape generally corresponding to the latter to provide openings or sockets between the wings on opposite sides of the tapered portion 23. It will be apparent that since the socket member 19 is of a one-piece construction, and because it may be made of sheet metal, it furnishes a strong and inexpensive structure which may be adequately secured to the arm 16 and is reenforced by the latter.

Connected to the arm 16 at the inner portion thereof is a pair of hinges 24 disposed at opposite sides of said arm, with their axes vertical. These hinges 24 connect the inner ends of the arms 17 and 18 to the arm 16. The axes of these hinges are located in such relation to the socket member 19 that arms 17 and 18 are maintained in alinement therewith so as to readily enter the socket member with the inner ends of the arms 17 and 18 directly abutting at 25 the opposite sides of the tapered portion 23. Thus it will be apparent that the socket member 19 affords a rigid mounting for the arms 17 and 18 to supplement the hinges 24 and to assure that they will lie in a common plane with the arm 16 so as to adequately resist any tendency of the dolly to sag or flex downward at its central region.

For maintaining the dolly in expanded position a link 26 is pivotally connected at 27 to the arm 17 and is formed with a hook portion 28 adapted to engage a headed pin 29 or the like on the arm 18. Desirably, the link 26 is positioned on the under side of its cooperating arms. When the dolly is collapsed to the position of Fig. 3, the arms 17 and 18 leave a socket member 19 and lie alongside of the arm 16, the link 26 being swung to a different position in which it again engages the pin or latch 29 to prevent the arms from moving apart. Since there might be some tendency for the different arms to move out of a common plane, it is preferred in order to maintain compactness and to avoid unnecessary strain on the hinges, that a supplemental means be employed such as one or more pins 30 fixed in the arm 16 and projecting from opposite sides thereof to engage in suitable recesses 31 of the arms 17 and 18.

Connected to the outer ends of the different arms, on the underside thereof are suitable antifriction means adapted to permit free and easy movement of the dolly along the floor or other supporting surface. Preferably the means referred to may include casters 32 of conventional construction. Each of these may have a plate 33 affixed to its arm. Centrally connected to the plate 33 by a rivet 34 is a plate 35 forming therewith a race 36 for a series of anti-friction balls 37. Formed on the plate 35 is a pair of spaced ears 38 carrying a roller or wheel 39. Thus each caster is adapted for rolling along the ground and for rotary motion about its vertical axis to facilitate the travel of the dolly.

Mounted on the different arms on the upper side thereof is a means adapted for detachable male and female engagement with the legs 14 of the tripod. Such means may include socket elements 40 which open upwardly. By making these elements out of rubber or other flexible material, they are adapted to easily deform to receive tripod legs of different sizes and shapes. The rubber cups 40 may be secured to the arms by screws 41.

The manner of using the device will now be briefly described. Upon disengaging the arm 26 from the pin 29, the arms 17 and 18 are swung in opposite directions away from the arm 16, and then the link 29 is moved to engage the pin 29 to lock the dolly in expanded operative position. As the dolly is being expanded, the arms 17 and 18 enter the socket member 19 which reenforces the connection between the arms to relatively rigidly maintain them in a common horizontal plane, thus avoiding any downward deflection or sagging of the dolly at its central region. Now the tripod 11 is adjusted so that its legs 14 are adapted to enter the rubber cups 40. On so engaging the tripod with the dolly, the latter cooperates to prevent relative angular movement between the legs 14. Consequently, if the operator should accidentally fail to properly lock the legs 14 in position, as sometimes happens, the tripod will not sag or drop. When thus assembled, the combined tripod and dolly may be easily and instantly shifted around from point to point as the photographer arranges and groups the flood lights about the object. The time and preparation for taking the picture is thus reduced, and the anxiety which usually accompanies the efforts of the artist is diminished. Now the tripod may merely be lifted off the dolly, the latch 26 opened and again engaged after the dolly has been collapsed as shown in Fig. 3. In so collapsing the dolly the pins 30 enter the recesses 31 to maintain the arms in a common plane thus avoiding any strain on the hinges, particularly as the arms 17 and 18 are no longer in engagement with the socket member 19. It will be noted that this construction of the socket member whereby certain of the arms become disengaged therefrom at least to a substantial degree is desirable because of the common socket structure employed. It will be appreciated that maximum compactness is obtained in the collapsed position because the cups 40 and the casters 32 lie grouped in side by side position, a result which would not be possible if these elements were mounted on a dolly whose arms did not always maintain a common plane but were movable in the manner of the legs 14 of the tripod.

The various parts herein referred to may be made of any suitable material such as metal, plastic, wood, or other materials or combinations thereof. Various details in construction may be changed within the scope of the appended claims as will be evident to those skilled in the art.

It will thus be seen that I have provided a device which fulfills the objects of the invention and is well adapted for practical use.

I claim:

1. A device adapted to carry a tripod for easy movability of the latter, including a horizontal frame having a series of radial, pivotally interconnected arms movable to be alongside of each other in a common plane in the collapsed position of the frame, anti-friction elements on the arms for movably carrying the frame, and means on the arms for releasably engaging the legs of a tripod to hold the latter on the frame in the expanded operative position of the frame, and a single means for selectively holding the frame in expanded or collapsed position, including a link pivotally connected to one arm and having latching connection with another arm to interengage these arms with the link spanning the intermediate arm in the collapsed position of the frame, said frame providing stop engagement for positioning certain of the arms in angularly spaced relation to the intermediate arm in the expanded position of the frame, and the link being movable to a different position to interconnect the above mentioned interengaged arms for holding the latter in the stopped relation with the said intermediate arm.

2. A collapsible tripod carrier, a frame including a first arm having at one end spaced plates, other arms lateral to the first arm and being hingedly connected thereto to provide parallel axes about which the arms are movable to lie alongside of the first arm in the collapsed position of the frame and to lie in a common plane with and in angularly spaced relation to the first arm in the expanded position of the frame, the first arm extending between the plates and the latter having openings for receiving adjacent end portions of the other arms in the expanded position of the frame to supplement the hinge connections for causing the different arms to lie relatively rigidly with the different arms angularly abutting each other between the plates for limiting the expansion of the frame, antifriction means on the arms for supporting the frame, and elements on the arms adapted for releasable male and female engagement with the legs of a tripod for carrying the latter on the frame.

3. A collapsible tripod carrier according to claim 2 wherein said plates are constructed to constitute the wings of a U-shaped member having a bight portion at the extreme adjacent end of the first arm.

4. A collapsible tripod carrier according to claim 2 wherein a link detachably interconnects the said other arms to maintain the frame collapsed and is movable to a different position to detachably interconnect said other arms to maintain the same in said abutment relation with the first arm to hold the frame expanded, said link being pivotally mounted on one of said other arms.

5. A collapsible tripod carrier according to claim 2 including pin means on the frame lying between and releasably interengaging the different arms in the collapsed position of the frame to maintain said arms in a common plane, said pins releasing their engagement when the frame is expanded.

6. A dolly including a first arm, a socket means fixed thereto, a plurality of companion arms, means pivotally connecting the latter to the first arm for angular movement in a common plane to collapse the dolly with the arms lying side by side and to expand the dolly with the different arms lying in radial relation to each other, the socket means being so related to the companion arms that the latter engage in the socket means when the dolly is expanded and leave the same when the dolly is collapsed, means associated with the socket member to abut the companion members to limit expansion of the dolly, and means on the arms for carrying an article to be supported thereby.

7. A dolly according to claim 6 including a link for releasably interconnecting the companion arms to maintain the dolly in expanded and in collapsed positions.

8. A dolly for a photographic flood-light carrying tripod comprising a frame disposed in a substantially horizontal plane having a plurality of radial arms pivotally interconnected at a central region of the frame, socket means re-enforcing the arms at their pivotal connections to maintain them in said horizontal plane, said socket means being fixed to one of said arms, hinge means connecting the latter to the other arms in such relation that said arms leave the socket means when the dolly is collapsed and enter the same when the dolly is expanded, and means for selectively locking the frame in collapsed and expanded operative positions.

IRVING SLOANE.

REFERENCES CITED

The following references are of record in the file of this patent:

UNITED STATES PATENTS

| Number | Name | Date |
| --- | --- | --- |
| 198,523 | Slemmons | Dec. 25, 1877 |
| 525,298 | Thiele et al. | Aug. 28, 1894 |
| 1,322,719 | Nelson | Nov. 25, 1919 |
| 1,350,963 | Fowler | Aug. 24, 1920 |
| 1,853,318 | Peters | Apr. 12, 1932 |
| 1,887,067 | Pehrsson | Nov. 8, 1932 |
| 2,357,165 | Brady | Aug. 29, 1944 |